United States Patent
Durand et al.

(10) Patent No.: US 11,443,570 B2
(45) Date of Patent: Sep. 13, 2022

(54) DATA STORAGE IN A HELMET SYSTEM

(71) Applicant: United Technologies Corporation, Farmington, CT (US)

(72) Inventors: Eric Durand, Chester, CT (US); Scott Beecher, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 246 days.

(21) Appl. No.: 16/437,348

(22) Filed: Jun. 11, 2019

(65) Prior Publication Data
US 2020/0394854 A1 Dec. 17, 2020

(51) Int. Cl.
G07C 5/08 (2006.01)
B64D 45/00 (2006.01)
G08G 5/00 (2006.01)

(52) U.S. Cl.
CPC ........... *G07C 5/0858* (2013.01); *B64D 45/00* (2013.01); *G08G 5/0004* (2013.01); *B64D 2045/0065* (2013.01)

(58) Field of Classification Search
CPC .................. G07C 5/0858; B64D 45/00; B64D 2045/0065; G08G 5/0004
See application file for complete search history.

(56) References Cited

U.S. PATENT DOCUMENTS

| | | | | |
|---|---|---|---|---|
| 5,072,218 | A * | 12/1991 | Spero ................... | G02B 27/017 340/980 |
| 5,561,855 | A * | 10/1996 | McFall ................... | A61F 9/068 2/8.6 |
| 7,515,054 | B2 * | 4/2009 | Torch .................... | A61B 3/112 351/207 |
| 8,509,998 | B2 | 8/2013 | Thomas et al. | |
| 9,975,640 | B1 | 5/2018 | Wang et al. | |
| 10,730,638 | B2 * | 8/2020 | Pogorelik ............. | B64D 45/00 |
| 2005/0202375 | A1 | 9/2005 | Nevo et al. | |
| 2005/0202868 | A1 * | 9/2005 | Sawano ................. | A63F 13/00 463/30 |
| 2014/0348484 | A1 * | 11/2014 | Erwin .................... | A42B 3/042 386/223 |

(Continued)

FOREIGN PATENT DOCUMENTS

CN 102750758 A 10/2012
EP 3065118 A1 9/2016

(Continued)

OTHER PUBLICATIONS

EP Application No. 20179504.4 Extended EP Search Report dated Nov. 4, 2020, 6 pages.

*Primary Examiner* — Quan Zhen Wang
*Assistant Examiner* — Mancil Littlejohn, Jr.
(74) *Attorney, Agent, or Firm* — Cantor Colburn LLP

(57) ABSTRACT

According to an aspect, a helmet system includes a communication interface configured to receive a plurality of aircraft data, a memory system configured to store the aircraft data, and a processing system operably coupled to the communication interface and the memory system. The processing system is configured to format the aircraft data into a plurality of time sequential records, store the time sequential records in the memory system, and manage storage within the memory system as a circular buffer.

20 Claims, 4 Drawing Sheets

(56) References Cited

U.S. PATENT DOCUMENTS

| | | | |
|---|---|---|---|
| 2015/0334113 A1* | 11/2015 | Angus | H04L 63/126 |
| | | | 713/168 |
| 2016/0260264 A1* | 9/2016 | Shih | G08G 5/0021 |
| 2016/0318616 A1 | 11/2016 | Fischer | |
| 2017/0251096 A1* | 8/2017 | Koepke | H04M 1/72421 |
| 2018/0251230 A1* | 9/2018 | Chavez | B64C 13/044 |

FOREIGN PATENT DOCUMENTS

| | | |
|---|---|---|
| GB | 2276006 A | 9/1994 |
| WO | 2002031709 A1 | 4/2002 |

* cited by examiner

DATA STORAGE IN A HELMET SYSTEM

BACKGROUND

The subject matter disclosed herein generally relates to aircraft systems and, more particularly, to a data storage system integrated in a helmet system for an aircraft operator.

Aircraft typically include a "black box", which includes a memory system embedded within an aircraft designed to capture flight data in a crash survivable unit. In some instances, the black box may not be recoverable due to crash severity, loss at sea, or other factors. When flight data is not retrievable, it can be challenging to fully understand the cause and associated conditions of a crash event.

BRIEF DESCRIPTION

According to one embodiment, a helmet system includes a communication interface configured to receive a plurality of aircraft data, a memory system configured to store the aircraft data, and a processing system operably coupled to the communication interface and the memory system. The processing system is configured to format the aircraft data into a plurality of time sequential records, store the time sequential records in the memory system, and manage storage within the memory system as a circular buffer.

In addition to one or more of the features described above or below, or as an alternative, further embodiments may include where the aircraft data includes one or more of flight data associated with operation of an aircraft and crash survivable memory unit data, and the flight data includes one or more of aircraft and engine parameters.

In addition to one or more of the features described above or below, or as an alternative, further embodiments may include where the memory system includes a data storage system configured to store the aircraft data and an operational memory configured to store values for display on a helmet visualization system of the helmet system.

In addition to one or more of the features described above or below, or as an alternative, further embodiments may include where the data storage system includes nonvolatile memory enclosed in a detachable housing that is separable from the helmet system.

In addition to one or more of the features described above or below, or as an alternative, further embodiments may include where the data storage system includes a data buffer configured to queue the time sequential records prior to writing to nonvolatile memory of the data storage system.

In addition to one or more of the features described above or below, or as an alternative, further embodiments may include a backup power supply configured to provide a temporary power source to complete writing of the time sequential records from the data buffer into the nonvolatile memory.

In addition to one or more of the features described above or below, or as an alternative, further embodiments may include where the communication interface includes a physical data bus configured to transfer data over a physical medium between the helmet system and one or more external communication nodes.

In addition to one or more of the features described above or below, or as an alternative, further embodiments may include where the communication interface includes a wireless communication link configured to transfer data wirelessly between the helmet system and one or more external communication nodes.

In addition to one or more of the features described above or below, or as an alternative, further embodiments may include where the processing system is further configured to compress the aircraft data to reduce a volume of data stored in the time sequential records.

In addition to one or more of the features described above or below, or as an alternative, further embodiments may include where the processing system is further configured to encrypt the aircraft data after compression and prior to being written to nonvolatile memory of the data storage system.

According to an embodiment, a method includes receiving a plurality of aircraft data at a communication interface of a helmet system of an aircraft, and formatting, by a processing system of the helmet system, the aircraft data into a plurality of time sequential records. The method further includes storing the time sequential records in a memory system of the helmet system, and managing storage within the memory system as a circular buffer.

In addition to one or more of the features described above or below, or as an alternative, further embodiments may include configuring a backup power supply to provide a temporary power source to complete writing of the time sequential records from the data buffer into the nonvolatile memory.

In addition to one or more of the features described above or below, or as an alternative, further embodiments may include compressing the aircraft data to reduce a volume of data stored in the time sequential records.

In addition to one or more of the features described above or below, or as an alternative, further embodiments may include encrypting the aircraft data after compression and prior to being written to nonvolatile memory of the data storage system.

A technical effect of the apparatus, systems and methods is achieved by incorporating a data storage system in a helmet system for an aircraft operator as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
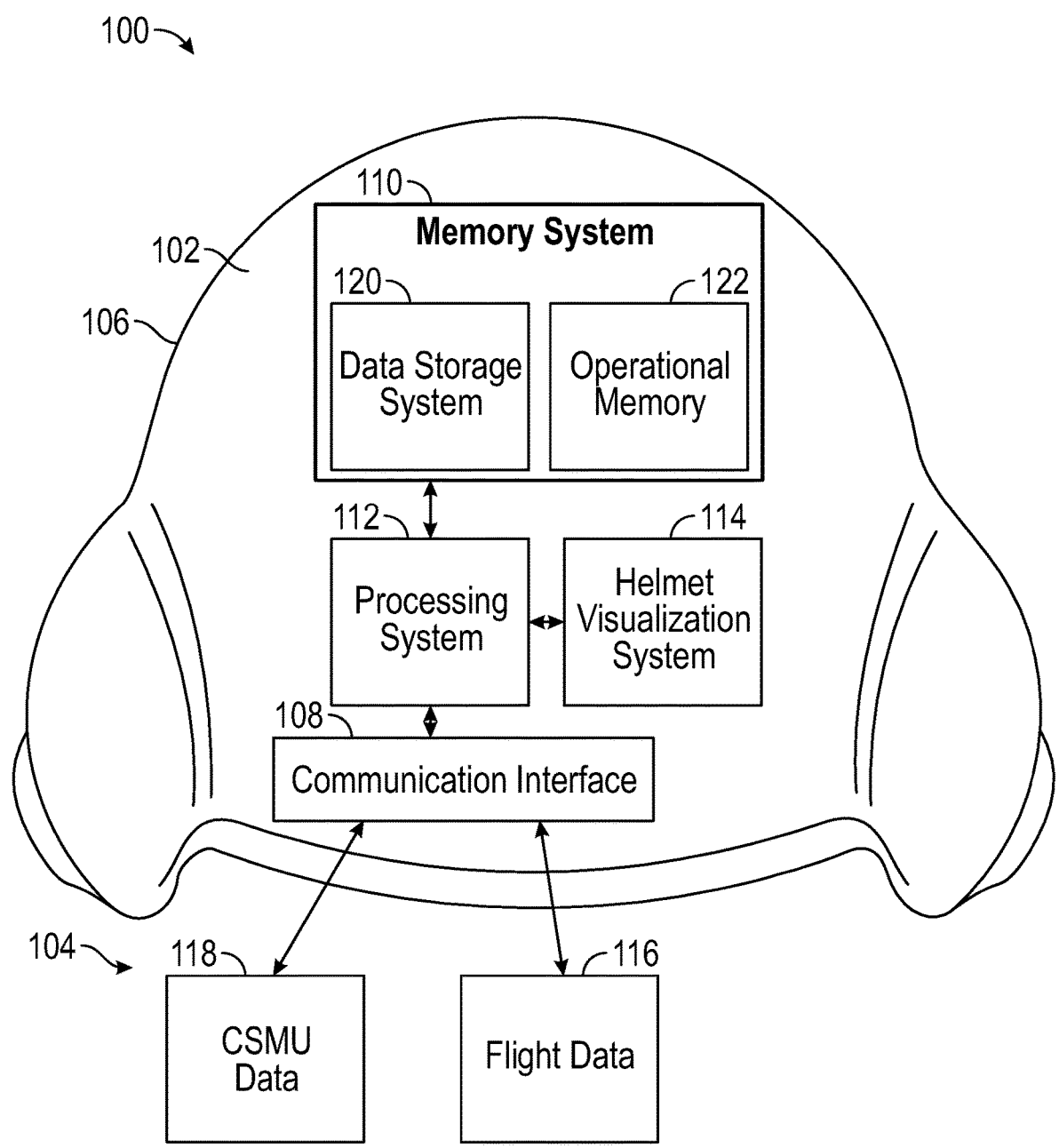
FIG. 1 is a block diagram of a helmet system, in accordance with an embodiment of the disclosure.

Referring now to the drawings, FIG. 1 illustrates a helmet system 102 that is configured to receive a plurality of aircraft data 104 within an aircraft 100. The helmet system 102 includes a helmet housing 106 that encapsulates a communication interface 108, a memory system 110, and a processing system 112. The helmet system 102 can also include a helmet visualization system 114 configured to display data visible to an aircraft operator wearing the helmet system 102. The communication interface 108 is configured to receive the aircraft data 104 from various external communication nodes, such as flight data 116 associated with operation of the aircraft 100 and/or crash survivable memory unit (CSMU) data 118. The flight data 116 can include aircraft and/or engine parameters from a flight data computer, an engine control, or other such data sources. The CSMU data 118 can include data logged to a CSMU (e.g., a "black box" data recorder), which may include a combination of data associated with an operational history and environment of the aircraft 100 and can include audio and/or video data. In the example of FIG. 1, the communication interface 108 can include a physical data bus configured to transfer data over a physical medium (e.g., electrical or optical connection) between the helmet system 102 and one or more external communication nodes. The external communication nodes can include on-board data sources, such as sources of the flight data 116 and CSMU data 118. The external communication nodes may also include ground-based sources, such as maintenance systems operable to access data stored in the memory system 110.

The memory system 110 is configured to store the aircraft data 104 and can include a data storage system 120 and operational memory 122. The data storage system 120 can include nonvolatile memory configured to store the aircraft data 104. The operational memory 122 can be configured to store values for display on the helmet visualization system 114 of the helmet system 102. In some embodiments, the operational memory 122 can include selected parameters from the aircraft data 104 and/or further processed values derived from the aircraft data 104 and/or sensors of the helmet visualization system 114. For example, the helmet visualization system 114 can include sensors (e.g., accelerometers, gyroscopes, etc.), cameras, and/or display elements that can sense a position of the head of an aircraft operator, a gaze direction, and other such factors accounted for in displaying data on a head-up display, digital gauges, and/or other display elements.

The processing system 112 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 110 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

Storing the aircraft data 104 in the memory system 110 enables the data to travel with the aircraft operator upon exiting the aircraft 100. For example, if the aircraft 100 is damaged or lost such that the CSMU data 118 is not recoverable, copies of data stored in the memory system 110 of the helmet system 102 may be used to investigate the sequence of events leading to the damage/loss of the aircraft 100. If the aircraft 100 includes multiple operators having a separate instance of the helmet system 102, each associated memory system 110 may retain redundant copies of the aircraft data 104 to provide further opportunities to recover records associated with the damage/loss of the aircraft 100. In some embodiments, the data storage system 120 can track and record the aircraft data 104 as redundant copies and may also track individual user data for each aircraft operator wearing the helmet system 102. For instance, biometric data, motion data, and other personalized data can be tracked separately for each aircraft operator with the results stored in the data storage system 120 of each helmet system 102.

Figure 2:
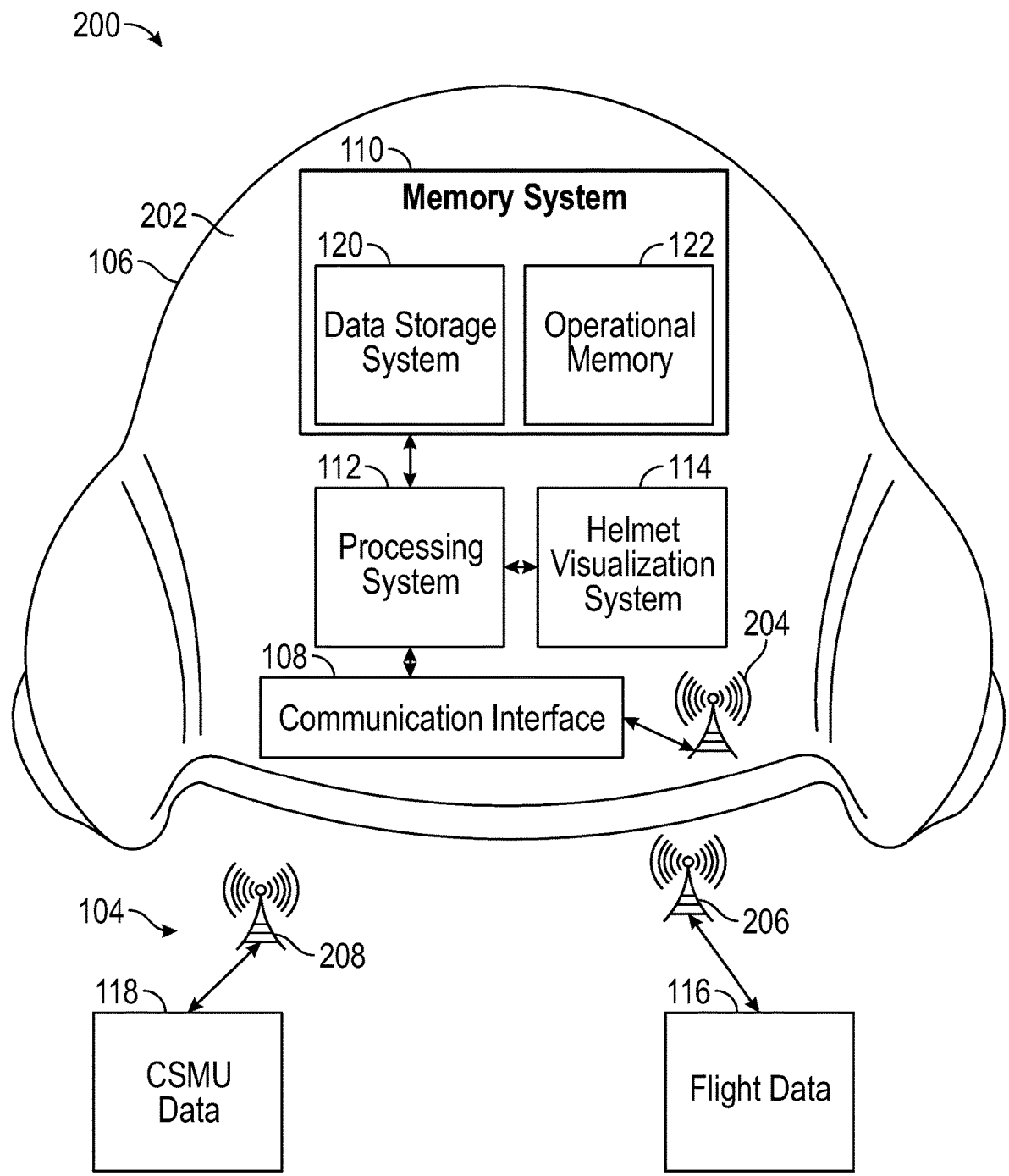
FIG. 2 is a block diagram of a helmet system supporting wireless communication, in accordance with an embodiment of the disclosure.

FIG. 2 depicts a block diagram of a helmet system 202 supporting wireless communication in accordance with an embodiment of the disclosure. Similar to the helmet system 102 of FIG. 1, the helmet system 202 can include a helmet housing 106 that encapsulates a communication interface 108, a memory system 110, and a processing system 112. The helmet system 202 can also include a helmet visualization system 114 configured to display data visible to an aircraft operator wearing the helmet system 202 in an aircraft 200. Also similar to the helmet system 102 of FIG. 1, the memory system 110 can include a data storage system 120 and operational memory 122. Rather than using physical connections for communication, the communication interface 108 of FIG. 2 can interface with an antenna system 204 to communicate wirelessly with one or more external communication nodes and receive aircraft data 104. For instance, the flight data 116 can be wirelessly transmitted through an antenna system 206 to the antenna system 204 and/or the CSMU data 118 can be wirelessly transmitted through an antenna system 208 to the antenna system 204. Wireless communication through antenna systems 204, 206, 208 may support Wi-Fi (e.g., radio wireless local area networking based on IEEE 802.11 or other applicable standards) and/or other wireless communication technologies known in the art supporting secure communication. The communication interface 108 of FIGS. 1 and 2 may both require authentication of communication nodes providing the aircraft data 104 and authentication to access the data stored within the data storage system 120.

Figure 3:
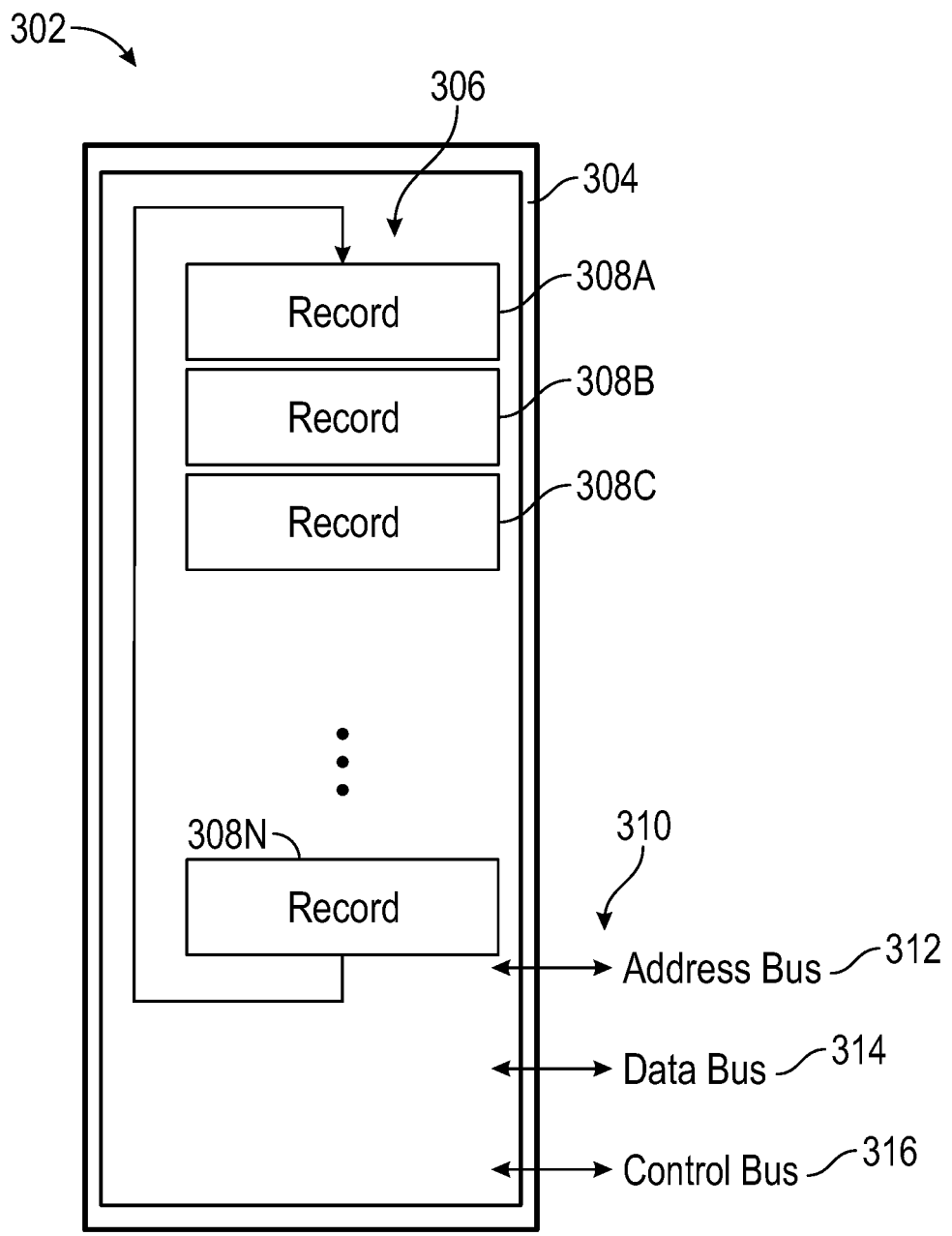
FIG. 3 is a block diagram of a data storage system in a detachable housing that is separable from a helmet system, in accordance with an embodiment of the disclosure.

FIG. 3 is a block diagram of a data storage system 302 in a detachable housing 304 that is separable from a helmet system, such as helmet systems 102 and 202 of FIGS. 1 and 2, in accordance with an embodiment of the disclosure. The data storage system 302 is an embodiment of the data storage system 120 of FIGS. 1 and 2 illustrated as a circular buffer 306. The circular buffer 306 can store a plurality of time sequential records 308 (e.g., records 308A, 308B, 308C, . . . , 308N, where "N" is an arbitrary number of records). The circular buffer 306 enables sequential storage to wrap around from a final record 308N back to a first record 308A such that the circular buffer 306 remains populated with the most recent copies of data should the volume of the time sequential records 308 exceed the capacity of the circular buffer 306. Although depicted as records 308A-308N, it will be understood that "N" represents any number of records that may be stored in the circular buffer 306 and can vary depending on implementation. The detachable housing 304 can be used to enable separation of the data storage system 302 from the helmet housing 106 of helmet system 102, 202, for instance, to facilitate data inspection, memory device upgrades, and other such considerations. An interface port 310 of the data storage system 302 can include an address bus 312, a data bus 314, and a control bus 316 to facilitate accessing the time sequential records 308 by the processing system 112 of FIGS. 1 and 2 and/or other components, such as a maintenance system offboard of the aircraft 100, 200 of FIGS. 1 and 2.

Although the circular buffer 306 is depicted as part of the data storage system 302, it will be understood that the circular buffer 306 can be implemented in the data storage system 120 of FIGS. 1 and 2 regardless of whether the detachable housing 304 is incorporated. Further, the data storage system 302 can include additional elements beyond those depicted in the example of FIG. 3, such as a power supply interface, latches, buffers, authentication logic, and various support circuits.

Figure 4:
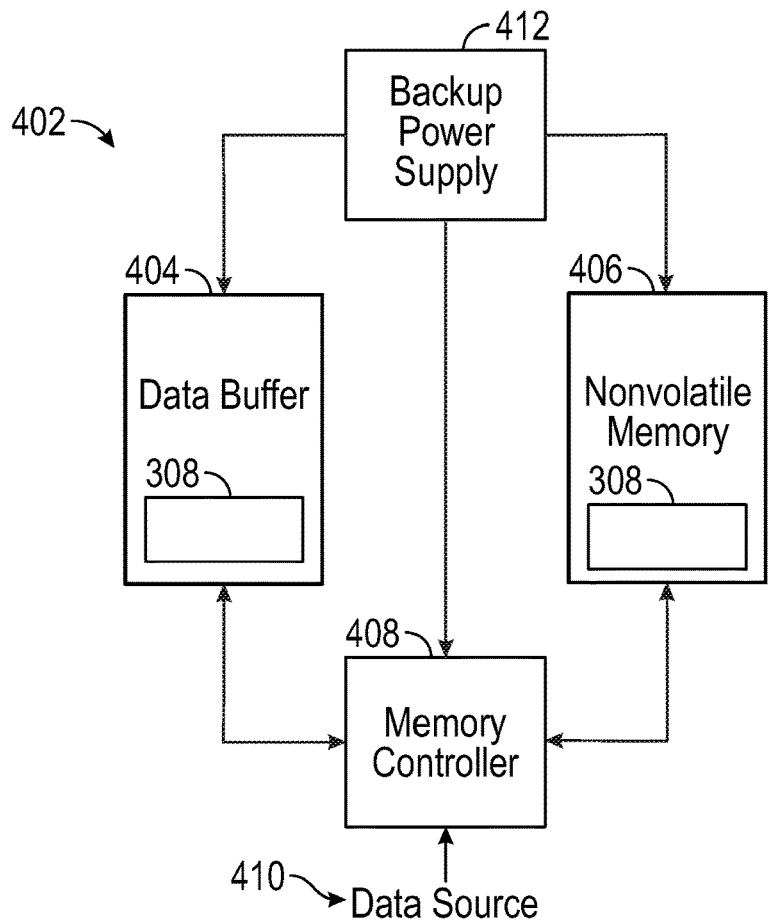
FIG. 4 is a block diagram of a data storage system with buffered storage, in accordance with an embodiment of the disclosure.

FIG. 4 is a block diagram of a data storage system 402 with buffered storage, in accordance with an embodiment of the disclosure. The data storage system 402 can be incorporated in the data storage system 120 of FIGS. 1 and 2 or in the data storage system 302 of FIG. 3. In the example of FIG. 4, the data storage system 402 includes a data buffer 404, a nonvolatile memory 406, and a memory controller 408. The memory controller 408 can receive data from a data source 410, such as the aircraft data 104 of FIGS. 1 and 2 or other values computed by the processing system 112 of FIGS. 1 and 2. In some embodiments, the memory controller 408 can be part of the processing system 112. Where the nonvolatile memory 406 does not have adequate storage bandwidth or other local processing is to be performed prior to writing data to the nonvolatile memory 406, the data buffer 404 can be used as a temporary storage location. For instance, where time sequential records 308 to be stored into the nonvolatile memory 406 include data from multiple sources that are not well synchronized, the data buffer 404 can queue values and partially form records until complete records are populated and ready to be written into the nonvolatile memory 406. Further, a backup power supply 412 can be coupled to the data buffer 404, nonvolatile memory 406, memory controller 408, and/or other components to provide a temporary power source to complete writing of the time sequential records 308 from the data buffer 404 into the nonvolatile memory 406.

To further reduce the amount of storage space needed in the data storage system 402, the memory controller 408 or processing system 112 can be configured to compress the data source 410 (e.g., aircraft data 104 of FIGS. 1 and 2) to reduce a volume of data stored in the time sequential records 308. In some embodiments, time sequential records 308 can be initially formed in an uncompressed format in the data buffer 404 and be compressed prior to being written to the nonvolatile memory 406. The compression can be any form of lossless compression known in the art. In some embodiments, the compressed data is encrypted prior to being written to the nonvolatile memory 406 for enhanced security.

Figure 5:
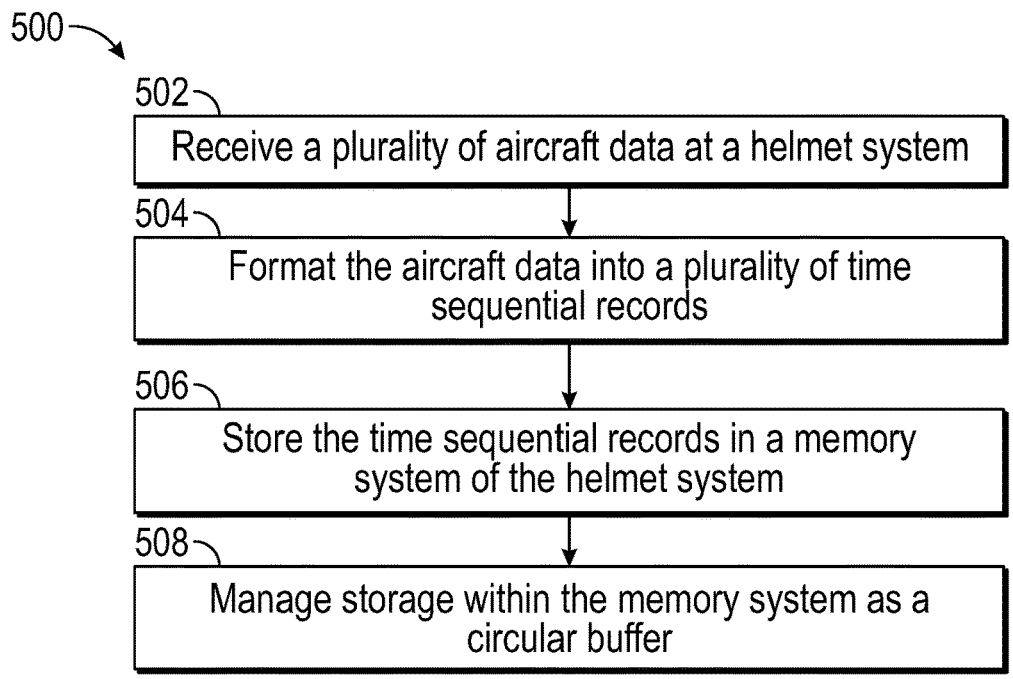
FIG. 5 is a flow chart illustrating a method of data storage in a helmet system, in accordance with an embodiment of the disclosure.

Referring now to FIG. 5 with continued reference to FIGS. 1-4, FIG. 5 is a flow chart illustrating a method 500 for data storage in a helmet system 102, 202 of FIGS. 1 and 2, in accordance with an embodiment. The method 500 may be performed, for example, by the processing system 112 of FIGS. 1 and 2 and/or the memory controller 408 of FIG. 4 in conjunction with other elements of FIGS. 1-4.

At block 502, a plurality of aircraft data 104 is received at a communication interface 108 of a helmet system 102, 202, of an aircraft 100, 200. The aircraft data 104 can include one or more of flight data 116 associated with operation of an aircraft 100, 200 and CSMU data 118. The flight data 116 can include one or more of aircraft parameters and engine parameters. The communication interface 108 can include a physical data bus configured to transfer data over a physical medium between the helmet system 102, 202 and one or more external communication nodes. Alternatively, the communication interface 108 can include a wireless communication link configured to transfer data wirelessly between the helmet system 102, 202 and one or more external communication nodes using, for instance, the antenna systems 204, 206, 208.

At block 504, the processing system 112 can format the aircraft data 104 into a plurality of time sequential records 308. At block 506, the time sequential records 308 are stored in a memory system 110 of the helmet system 102, 202. The memory system 110 can include a data storage system 120, 302, 402 configured to store the aircraft data 104 and an operational memory 122 configured to store values for display on a helmet visualization system 114 of the helmet system 102, 202. The data storage system 120, 302, 402 can include nonvolatile memory 406 enclosed in a detachable housing 304 that is separable from the helmet system 102, 202. The data storage system 120, 302, 402 can include a data buffer 404 configured to queue the time sequential records 308 prior to writing to nonvolatile memory 406 of the data storage system 120, 302, 402. A backup power supply 412 can be configured to provide a temporary power source to complete writing of the time sequential records 308 from the data buffer 404 into the nonvolatile memory 406.

At block 508, the processing system 112 can managing storage within the memory system 110 as a circular buffer 306. The processing system 112 can be further configured to compress the aircraft data 104 to reduce a volume of data stored in the time sequential records 308.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A helmet system comprising:
   a communication interface configured to receive a plurality of aircraft data comprising a copy of data stored in a crash survivable memory unit of an aircraft received on a first wireless link, and the aircraft data comprising flight data including one or more of aircraft and engine parameters received on a second wireless link;

a helmet visualization system configured to display data visible to an aircraft operator wearing the helmet system;
a memory system comprising a data storage system configured to store the aircraft data and an operational memory configured to store values for display on the helmet visualization system;
a processing system operably coupled to the communication interface and the memory system, the processing system configured to:
  format the aircraft data, received through the communication interface, into a plurality of time sequential records;
  store the time sequential records in the data storage system of the memory system;
  manage storage within the data storage system of the memory system as a circular buffer; and
  store, in the memory system, user data associated with the aircraft operator; and
a helmet housing, wherein the memory system is disposed in the helmet housing.

2. The helmet system of claim 1, wherein the data storage system comprises nonvolatile memory enclosed in a detachable housing that is separable from the helmet housing of the helmet system.

3. The helmet system of claim 1, wherein the data storage system comprises a data buffer configured to queue the time sequential records prior to writing to nonvolatile memory of the data storage system.

4. The helmet system of claim 3, further comprising a backup power supply configured to provide a temporary power source to complete writing of the time sequential records from the data buffer into the nonvolatile memory.

5. The helmet system of claim 1, wherein the communication interface comprises a physical data bus configured to transfer data over a physical medium between the helmet system and one or more external communication nodes.

6. The helmet system of claim 1, wherein the communication interface comprises a wireless communication link configured to transfer data wirelessly between the helmet system and one or more external communication nodes.

7. The helmet system of claim 1, wherein the processing system is further configured to compress the aircraft data to reduce a volume of data stored in the time sequential records.

8. The helmet system of claim 7, wherein the processing system is further configured to encrypt the aircraft data after compression and prior to being written to nonvolatile memory of the data storage system.

9. The helmet system of claim 1, wherein the communication interface is configured to:
  authenticate communication to provide the aircraft data to the helmet system;
  communicate with a maintenance system offboard of the aircraft; and
  authenticate communication to access data stored in the memory system.

10. The helmet system of claim 1, wherein the data storage system comprises a data buffer configured to queue the time sequential records as partially formed records until complete records are populated from two or more asynchronous sources prior to writing to nonvolatile memory of the data storage system.

11. A method comprising:
  receiving a plurality of aircraft data at a communication interface of a helmet system of an aircraft, wherein the aircraft data comprises a copy of data stored in a crash survivable memory unit of the aircraft received on a first wireless link, and the aircraft data comprising flight data including one or more of aircraft and engine parameters received on a second wireless link;
  formatting, by a processing system of the helmet system, the aircraft data, received through the communication interface, into a plurality of time sequential records;
  storing the time sequential records in a memory system of the helmet system;
  managing storage within the memory system as a circular buffer; and
  storing, in the memory system, user data associated with an aircraft operator;
  wherein the memory system comprises a data storage system configured to store the aircraft data and an operational memory configured to store values for display on a helmet visualization system of the helmet system, wherein the helmet visualization system is configured to display data visible to the aircraft operator wearing the helmet system; and
  wherein the memory system is disposed in the helmet housing.

12. The method of claim 11, wherein the data storage system comprises nonvolatile memory enclosed in a detachable housing that is separable from the helmet housing of the helmet system.

13. The method of claim 11, wherein the data storage system comprises a data buffer configured to queue the time sequential records prior to writing to nonvolatile memory of the data storage system.

14. The method of claim 13, further comprising:
  configuring a backup power supply to provide a temporary power source to complete writing of the time sequential records from the data buffer into the nonvolatile memory.

15. The method of claim 11, wherein the communication interface comprises a physical data bus configured to transfer data over a physical medium between the helmet system and one or more external communication nodes.

16. The method of claim 11, wherein the communication interface comprises a wireless communication link configured to transfer data wirelessly between the helmet system and one or more external communication nodes.

17. The method of claim 11, further comprising:
  compressing the aircraft data to reduce a volume of data stored in the time sequential records.

18. The method of claim 17, further comprising:
  encrypting the aircraft data after compression and prior to being written to nonvolatile memory of the data storage system.

19. The helmet system of claim 1, wherein the processing system is disposed in the helmet housing.

20. The helmet system of claim 19, wherein the communication interface is disposed in the helmet housing.

* * * * *